United States Patent
Nagashima et al.

(10) Patent No.: US 12,263,660 B2
(45) Date of Patent: Apr. 1, 2025

(54) DECORATIVE SHEET

(71) Applicant: TOPPAN INC., Tokyo (JP)

(72) Inventors: Mami Nagashima, Tokyo (JP); Masamitsu Nagahama, Tokyo (JP); Masatoshi Takahashi, Tokyo (JP)

(73) Assignee: TOPPAN INC., Tokyo (JP)

( * ) Notice: Subject to any disclaimer, the term of this patent is extended or adjusted under 35 U.S.C. 154(b) by 152 days.

(21) Appl. No.: 18/071,783

(22) Filed: Nov. 30, 2022

(65) Prior Publication Data

US 2023/0087440 A1    Mar. 23, 2023

Related U.S. Application Data

(63) Continuation of application No. PCT/JP2021/021123, filed on Jun. 3, 2021.

(30) Foreign Application Priority Data

Jun. 3, 2020   (JP) .................. 2020-097171

(51) Int. Cl.
  *B32B 3/30*   (2006.01)
  *B32B 7/022*   (2019.01)
  (Continued)

(52) U.S. Cl.
  CPC ............ *B32B 3/30* (2013.01); *B32B 7/022* (2019.01); *B32B 27/08* (2013.01); *B32B 27/20* (2013.01);
  (Continued)

(58) Field of Classification Search
  CPC .. B32B 3/30; B32B 7/02; B32B 7/022; B32B 27/08; B32B 27/20; B32B 27/32;
  (Continued)

(56) References Cited

U.S. PATENT DOCUMENTS

| | | |
|---|---|---|
| 2018/0207907 A1 | 7/2018 | Okabe |
| 2019/0248100 A1 | 8/2019 | Horio et al. |

FOREIGN PATENT DOCUMENTS

| | | |
|---|---|---|
| JP | 05-086306 A | 4/1993 |
| JP | 05-222819 A | 8/1993 |

(Continued)

OTHER PUBLICATIONS

Machine translation of detailed description of JP 2015-187378 acquired on Aug. 21, 2024.*

(Continued)

*Primary Examiner* — Gerard Higgins
(74) *Attorney, Agent, or Firm* — Foley & Lardner LLP

(57) ABSTRACT

A decorative sheet includes at least a topcoat layer disposed to face a substrate layer in a first direction, the front surface of the topcoat layer having a wavy roughness profile measured with a cutoff wavelength $\lambda s$ of 8 μm and a cutoff wavelength $\lambda c$ of 2.5 mm according to JIS B0601:2001 in a second direction perpendicular to the first direction, a selected evaluation portion of the wavy roughness profile comprising a plurality of profile elements, an evaluation length of the selected evaluation portion of the wavy roughness profile having 10 mm, the selected evaluation portion of the wavy roughness profile being designed to have an arithmetic mean deviation Ra of 10 μm or less; and to have a mean width of the profile elements and a ten point height, the mean width and the ten point height satisfying the following expression: $5 \leq RSm/RzJIS \leq 40 \ldots$ (1), where RSm represents the mean width, and RzJIS represents the ten point height.

6 Claims, 1 Drawing Sheet

(51) Int. Cl.
  *B32B 27/08* (2006.01)
  *B32B 27/20* (2006.01)
  *B32B 27/32* (2006.01)
  *B32B 33/00* (2006.01)

(52) U.S. Cl.
  CPC .............. *B32B 27/32* (2013.01); *B32B 33/00* (2013.01); *B32B 2250/242* (2013.01); *B32B 2255/10* (2013.01); *B32B 2255/26* (2013.01); *B32B 2307/4023* (2013.01); *B32B 2307/536* (2013.01); *B32B 2307/538* (2013.01); *B32B 2307/7376* (2023.05); *B32B 2451/00* (2013.01)

(58) Field of Classification Search
  CPC .............. B32B 33/00; B32B 2250/242; B32B 2255/10; B32B 2255/26; B32B 2307/4023; B32B 2307/536; B32B 2307/538; B32B 2307/7376; B32B 2451/00
  See application file for complete search history.

(56) References Cited

FOREIGN PATENT DOCUMENTS

| | | |
|---|---|---|
| JP | 05-246001 A | 9/1993 |
| JP | 10-058611 A | 3/1998 |
| JP | 11-058614 A | 3/1999 |
| JP | 2015-187378 A | 10/2015 |
| JP | 2016-069798 A | 5/2016 |
| JP | 2016-097510 A | 5/2016 |
| JP | 2016190467 A * | 11/2016 |
| JP | 2020-001226 A | 1/2020 |
| WO | WO-2018062340 A1 * | 4/2018 ............. B32B 21/02 |

OTHER PUBLICATIONS

European Extended Search Report issued in corresponding European Patent Application No. 21817059.5 dated Oct. 11, 2023 (7 pages).

Monoweb, "It's pretty deep! This is a brief introduction to the basics of surface roughness parameters that you need to know", dated May 23, 2022, Retrieved from the internet: https://d-monoweb.com/expert_column/surface-roughness-parameter/ on Jan. 5, 2024.

Office Action issued in corresponding Japanese Patent Application No. 2020-097171 dated Jan. 16, 2024 (6 pages).

International Searching Authority, "International Search Report," issued in connection with International Patent Application No. PCT/JP2021/021123, dated Aug. 3, 2021.

International Searching Authority, "Written Opinion," issued in connection with International Patent Application No. PCT/JP2021/021123, dated Aug. 3, 2021.

Office Action issued in corresponding Chinese Patent Application No. 202180036574.2 dated Jan. 23, 2025.

* cited by examiner

DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/021123, filed on Jun. 3, 2021, which in turn claims the benefit of JP 2020-097171, filed Jun. 3, 2020, the disclosures of all which are incorporated herein by reference in its entirety.

TECHNICAL FIELD

The present invention relates to decorative sheets.

BACKGROUND ART

Decorative sheets are used to decorate the surface of interior and exterior materials of buildings such as houses, construction materials such as finishing materials as well as doors and windows, furniture and fixtures, housing equipment, home appliances, and the like. Some decorative sheets are applied to semi-exterior materials that are affected by wind and rain to some extent, such as exterior materials under the eaves and entrance doors, or used in children's rooms, kitchens and dining rooms, washrooms, and other spaces that are required to have good wipeability, water repellency, stain resistance, and the like against markers, stains resulting from daily activities, and so on.

Decorative materials (including decorative boards, decorative paper, decorative sheets, and the like) used for the various purposes described above may be required to have durability and weather resistance that allow them to be used for a long time of the order of decades. Additionally, these decorative materials may be required to be stain resistant so that, even when a staining substance adheres to a surface due to the natural action such as of rainwater or dirt, or due to the user being careless, it can be easily wiped off and the clean appearance of the surface can be maintained.

In particular, kitchens and dining rooms, where food-related staining substances such as oils (e.g., salad oil and tempura oil), and colored seasonings (e.g., soy sauce and Worcestershire sauce) often spill or splash and adhere to a surface, are required to be even more resistant to stains resulting from daily activities than normal spaces such as living rooms and bedrooms. Children's rooms, where dirt brought in from the outside on the hands, feet, or clothes of children and scribbles drawn using crayons, markers and the like often adhere to a surface, are also required to be even more resistant to stains resulting from daily activities than normal spaces such as living rooms and bedrooms. Spaces such as toilets, bathrooms, and laundry rooms, where water and soap solution often splash when activities such as flushing the toilet, washing one's hands, and washing clothes are performed, are also required to be even more resistant to stains resulting from daily activities than normal spaces such as living rooms and bedrooms. The above-described stain resistance cannot be reached with, for example, a general urethane coating used on normal decorative materials.

Another example of the method of making the surface of a decorative material highly stain resistant is the method of forming an anti-staining layer on the surface by applying a silicone resin or fluorine-based resin having a low surface tension (see, for example, PTL 1). However, this method may cause problems such as the surface becoming extremely slippery, resulting in an unpleasant tactile sensation and reduced ease of handling, and the surface being susceptible to scratches and wear due to the lack of surface hardness.

To address these problems, conventionally, a method of forming the anti-staining layer by adding silicone oil to a normal coating of, for example, urethane resin (see, for example, PTL 2) has been relatively widely employed. The main component of the coating of this anti-staining layer is a normal decorative coating such as urethane resin. Therefore, this anti-staining layer has sufficient surface physical properties such as scratch resistance, wear resistance, and weather resistance. At the same time, part of the silicone oil in the coating seeps out to the surface of the coating and forms an oil film that exerts stain resistance for preventing the staining substances from adhering to the surface. This anti-staining layer provides highly advantageous effects.

However, when a staining substance is wiped off, this oil film may be wiped away along with it. While there is enough silicone oil in the coating, it seeps out again and forms an oil film so that the coating regains its stain resistance. However, when the silicone oil is depleted after being wiped off repeatedly over a long period of time, it no longer exerts stain resistance. Therefore, the anti-staining layer described above has a problem in the durability of stain resistance. Additionally, in particular, in the case of decorative materials such as decorative paper, decorative sheets, and wallpaper that are supplied in rolls, the silicone oil that has seeped out to the surface of the coating may transfer to the back of the decorative material, repel the adhesive when it is bonded onto the substrate or underlying surface, and hinder adhesion.

As means of imparting the surface coating of the decorative material with long-lasting stain resistance while ensuring sufficient surface physical properties, various methods of chemically bonding the base resin of the coating with a silicone component for imparting stain resistance have already been examined. A typical example is a two-component cross-linked resin containing an acrylic resin as the main component and a silicone compound as a curing agent (see, for example, PTL 3 and PTL 4). This resin indeed has improved stain resistance as compared with the original acrylic resin since the introduction of the silicone component reduces surface tension. However, perhaps because the silicone component, as a cross-linking agent, is bound by two acrylic skeletons and cannot move freely, in many cases, the effect of improving stain resistance is smaller than that obtained when silicone oil is added.

A method using a (meth)acrylate-based ionizing radiation-curable resin containing a silicone (meth)acrylate compound has also been proposed (see, for example, PTL 5). However, since this method uses a special curing system such as an electron beam or ultraviolet curing system, expensive equipment is required. This, combined with other problems such as applicability to special shapes that are difficult to uniformly irradiate and deterioration of the substrate due to the irradiation, often limits the range of applications. Additionally, since ionizing radiation-curable resins have a very high crosslink density, the extremely rigid, three-dimensional crosslinked structure of the cured product impedes the molecular motion of the silicone component. This also makes it difficult to obtain a sufficient effect of improving the stain resistance in many cases.

CITATION LIST

Patent Literature

PTL 1: JP H11-58614 A; PTL 2: JP H10-58611 A; PTL 3: JP H5-222819 A; PTL 4: JP H5-246001 A; PTL 5: JP H5-86306 A.

SUMMARY OF THE INVENTION

Technical Problem

The present invention has been made to solve the above-described problems in the prior art, and an object thereof is to provide a stain-resistant decorative material (decorative sheet) that not only offers good stain resistance to various kinds of stains resulting from daily activities, but also good designability such as tactile sensation and design appearance.

Solution to Problem

The stain-resistant decorative material (decorative sheet) of the present invention is characterized by improved stain resistance and designability obtained by the asperities imparted to the surface thereof. Specifically, a stain-resistant decorative material (decorative sheet) according to an aspect of the present invention includes at least a substrate layer having opposite first and second major surfaces; and a surface protective layer having front and back surfaces, the back surface being arranged to face the first major surface of the substrate layer in a first direction, the front surface of the surface protective layer having a wavy roughness profile measured with a cutoff wavelength λs of 8 μm and a cutoff wavelength λc of 2.5 mm according to JIS B0601:2001 in a second direction perpendicular to the first direction, a selected evaluation portion of the wavy roughness profile comprising a plurality of profile elements, an evaluation length of the selected evaluation portion of the wavy roughness profile having 10 mm, the selected evaluation portion of the wavy roughness profile being designed to:
(1) have an arithmetic mean deviation Ra of 10 μm or less; and
(2) have a mean width of the profile elements and a ten point height, the mean width and the ten point height satisfying the following expression (1):

$$5 \leq RSm/RzJIS \leq 40 \qquad (1)$$

where
RSm represents the mean width, and
RzJIS represents the ten point height.

In addition, the inventors found that by encapsulating the nucleating agent for improving the crystallinity of polypropylene in vesicles having a single-layer outer membrane to transform it into nucleating agent vesicles and adding them to the polypropylene resin, and further, adjusting the Martens hardness to a value in the optimum range determined by examining various manufacturing processes and repeating experiments, a decorative sheet with improved scratch resistance can be provided.

Specifically, the decorative sheet according to an aspect of the present invention may include a substrate layer including two skin layers each containing a polypropylene resin, and a core layer interposed between the skin layers and containing an inorganic pigment and a polypropylene resin. The skin layers may each be formed by adding, to the polypropylene resin, nucleating agent vesicles, which are nanoscale nucleating agents encapsulated in vesicles having a single-layer outer membrane.

The nucleating agent vesicle has a structure in which a nucleating agent is encapsulated in a capsule-like vesicle having a single-layer outer membrane, and can be prepared by the supercritical reverse phase evaporation method. The nucleating agent is a substance that serves as a starting point for crystallization in a crystalline polypropylene resin.

Advantageous Effects of Invention

According to an aspect of the present invention, a decorative sheet having improved stain resistance and designability (tactile sensation and design appearance) can be provided by controlling the shape of the asperities imparted to the surface of the substrate.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

A decorative material of the present embodiment includes at least a base B and a decorative sheet 10. The base B and the decorative sheet 10 of the present embodiment will be described below in detail.

Figure 1:
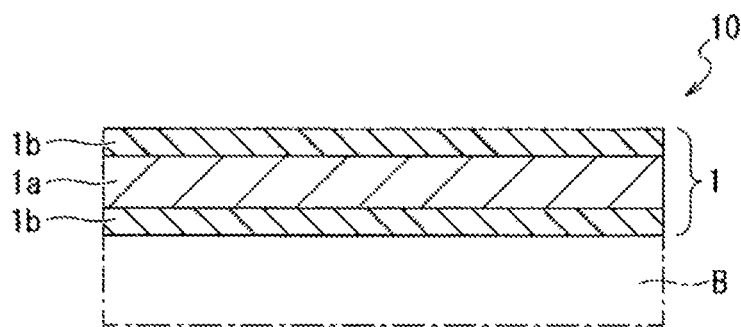
FIG. 1 is a cross-sectional view illustrating a configuration of a decorative sheet according to an embodiment of the present invention.
Figure 2:
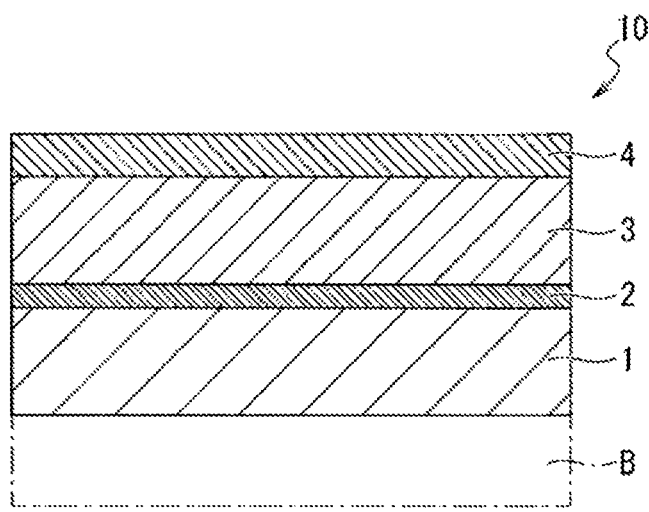
FIG. 2 is a cross-sectional view illustrating a configuration of another decorative sheet according to the embodiment of the present invention.

A base is denoted by B in FIGS. 1 and 2. The base B is a base to which the decorate sheet 10 described later is bonded. For example, the base B can be, but not limited to, a wood board, inorganic board, metal plate, or composite plate made up of a plurality of materials. A primer layer, concealing layer, or the like may be provided between the decorative sheet 10 and base B as appropriate.

The decorative sheet 10 of this embodiment includes, for example, a substrate layer 1, a pattern layer 2, a transparent resin layer 3, and a topcoat layer 4 in this order. The following description addresses the individual layers forming the decorative sheet 10.

<Substrate Layer 1>

The substrate layer 1 may be, for example, a colored polypropylene film having a three-layer structure including an intermediate core layer 1a, and a skin layer 1b on each side thereof. The core layer 1a is mainly made of polypropylene resin, and the polypropylene resin may be colored by mixing an inorganic pigment. The skin layers 1b may contain polypropylene resin. The skin layers 1b may not contain an inorganic pigment.

(Polypropylene Resin)

Considering the dispersibility of inorganic pigments, the polypropylene resin used for the core layer 1a is preferably a highly flexible random polypropylene resin having some ethylene content, or a highly flexible mixture of a known amorphous polypropylene resin and a random polypropylene resin or highly crystalline homopolypropylene resin.

The polypropylene resin used for the skin layer 1b is preferably a highly crystalline homopolypropylene because there is no need to take into consideration the dispersibility of an inorganic pigment, but it is not limited to highly crystalline homopolypropylene. In applications where workability such as flexibility has more importance, the highly crystalline homopolypropylene can be mixed with, for example, a random polypropylene resin having an ethylene content within a predetermined range or a known amorphous polypropylene resin.

The skin layers 1b of the substrate layer 1 made of a colored polypropylene film preferably have a Martens hardness of 80 N/mm2 or more and 120 N/mm2 or less, and the core layer 1a preferably has a Martens hardness of 50 N/mm2 or more and 80 N/mm2 or less.

When the Martens hardness of the core layer 1a is lower than 50 N/mm2, it is likely to be difficult to obtain the required scratch resistance for practical use. On the other hand, when the Martens hardness of the core layer 1a exceeds 80 N/mm2, the crystallinity is excessively high, and problems may occur such as blushing or cracking occurring while it is being bent, and cracking occurring while it is undergoing impact testing.

When the Martens hardness of the skin layers 1b is lower than 80 N/mm2, it is likely to be difficult to obtain the required scratch resistance for practical use. On the other hand, when the Martens hardness of the skin layers 1b exceeds 120 N/mm2, the crystallinity is excessively high, and problems may occur such as blushing or cracking occurring while it is being bent, and cracking occurring while it is undergoing impact testing, even when nucleating agent vesicles are used.

The preferred range of the Martens hardness of the core layer 1a of the substrate layer 1 is 60 N/mm2 or more and 80 N/mm2 or less, and the preferred range of the Martens hardness of the skin layers 1b of the substrate layer 1 is 80 N/mm2 or more and 100 N/mm2 or less. When they are in these ranges, good scratch resistance, impact resistance, and flexibility can all be achieved.

The Martens hardness is a type of indicator showing the hardness of a substance. It is defined as the quotient of the indentation force, calculated from the load applied to an indenter to press it into the surface of the sample, divided by the surface area of the indentation, calculated from the indentation depth obtained by measuring the depth (indentation depth) of the indentation formed at that time. This measurement is carried out using the method defined in ISO14577.

An arithmetic mean deviation Ra and a ten-point height Rz (RzJIS) of the roughness profile of the topcoat layer (surface protective layer) 4 indicate height-direction information on the asperities formed on the topcoat layer 4.

A mean width RSm is the mean value of the width Xs values of the profile elements in a stretch of the sampling length, and indicates information on the asperities formed on the surface of the topcoat layer 4 in the lateral direction, such as the pitch.

When Ra and Rz are small, the asperities formed on the surface of the topcoat layer 4 are small, which means that it has a shape that prevents staining substances from easily adhering, and when RSm is large, the asperities formed on the surface of the topcoat layer 4 have a large pitch, which means that it has a shape that makes it easy to wipe off staining substances even when they enter the gaps in the uneven surface of the topcoat layer 4.

In the present embodiment, when Ra of the topcoat layer 4 is greater than 10 μm and RSm/RzJIS is smaller than 5, the topcoat layer 4 has a shape in which the asperities formed on the surface thereof are large and have a small pitch and thus a high density. In this case, when a staining substance adheres strongly, it cannot be easily wiped off, and therefore it cannot be said that the topcoat layer 4 has good stain resistance.

When RSm/RzJIS is greater than 40, the asperities have a gentle slope, which often impairs the designability.

Ra of the topcoat layer 4 is preferably 1.0 μm or more. That is, Ra of the topcoat layer 4 in the present embodiment is preferably in the range of 1.0 μm or more and 10 μm or less. When Ra of the topcoat layer 4 is smaller than 1.0 um, it is inferior in designability and may reduce the commercial value of the decorative sheet 10.

Ra was measured using a measurement method according to JIS B0601:2001 with a surface roughness meter (manufactured by Mitutoyo Co., SJ-310 model), with a cutoff wavelength λc of 2.5 mm, a cutoff wavelength λs of 8 um, and an evaluation length of 10 mm, in the pattern direction when there was a pattern, and in a direction perpendicular to a direction in which the topcoat layer 4 faces the substrate layer 1 when there was no pattern. Measurements were made at five randomly chosen points, and the mean value was used as the measured value. The same applies to RSm and RzJIS.

Examples of methods of adjusting the surface roughness of the topcoat layer 4 include (1) the method of adding an inorganic filler to the topcoat layer 4, and (2) the method of forming an embossed shape using an embossing die. The method (2) is used in this embodiment to adjust the surface roughness of the topcoat layer 4.

In this embodiment, the thickness of the substrate layer 1 made of a colored polypropylene film may be in the range of 40 µm or more and 200 µm or less.

When the thickness of the substrate layer 1 is less than 40 um, the film strength is insufficient even when the Martens hardness of the skin layers 1b is in the optimum range, and it is difficult to prevent defects from being caused during printing and a decrease in the scratch resistance. It is also difficult to maintain the surface smoothness during wrapping. On the other hand, when the thickness of the substrate layer 1 exceeds 200 um, there is a high possibility that defects such as blushing and cracking occur during bending, and its conformance to the end faces and laminated part of the wooden base decreases significantly during wrapping, resulting in an insufficient adhesion. This may lead to problems such as peeling after some time.

An even more preferable thickness range of the substrate layer 1 is 60 µm or more and 150 µm or less. When the thickness is within this range, prevention of the defects generated during printing, surface smoothness during wrapping, scratch resistance, and flexibility can all be reliably achieved.

As for the thicknesses of the skin layers 1b and the core layer 1a of the substrate layer 1, it is preferable that the thickness of the core layer 1a is 3 times or more and 50 times or less that of each of the skin layers 1b. When the thickness of the core layer 1a is less than 3 times the thickness of the skin layer 1b, it is difficult to satisfy the minimum concealing effect a decorative sheet is required to provide. When the thickness of the core layer 1a is larger than 50 times the thickness of the skin layer 1b, the film strength becomes insufficient since the thickness of the skin layers 1b is relatively too small, which makes it difficult to prevent defects from being caused during printing and a decrease in the scratch resistance even when the Martens hardness is in the optimum range.

An even more preferable thickness range of the core layer 1a is 10 times or more and 40 times or less that of each of the skin layers 1b. When the thickness is within this range, the concealing effect, prevention of defects generated during printing, surface smoothness during wrapping, scratch resistance, and flexibility can all be reliably achieved.

As described above, in this embodiment, it is preferable to use a highly crystalline polypropylene resin as the polypropylene resin used for the skin layers 1b. In particular, it is preferred that a crystalline homopolypropylene resin that is a propylene homopolymer having an isotactic pentad fraction (mmmm fraction) of 95% or higher is contained in a proportion of 30% by mass or more and 100% by mass or less to the total mass of the polypropylene resin.

The crystallization temperature of the polypropylene resin is generally within the range of 100° C. to 130° C., and 110° C. to 140° C. when a nucleating agent is added. The Martens hardness of the skin layers 1b of the colored polypropylene film in the decorative sheet 10 of the present embodiment is adjusted to be within the range of 80 N/mm2 or more and 120 N/mm2 or less by controlling the duration of cooling from the crystallization temperature in the above range to the temperature at which curing is completed by a known cooling process. When the content of the highly crystalline homopolypropylene resin is less than 30% by mass, due to insufficient crystallinity, the Martens hardness may be lower than the preferred range even when the cooling process is controlled.

The isotactic pentad fraction (mmmm fraction) is calculated from a value (electromagnetic wave absorption ratio) obtained by making the resin material resonate at a predetermined resonance frequency under 13C-NMR measurement (nuclear magnetic resonance measurement) using carbon C (nuclide) with an atomic mass of 13. The isotactic pentad fraction defines the atomic arrangement, the electronic structure, and the molecular microstructure in the resin material. The pentad fraction of the crystalline polypropylene resin is the ratio of five propylene units in a row determined by 13C-NMR, and is used as a measure of crystallinity or stereoregularity. The pentad fraction is one of the important factors that mainly determine the scratch resistance of the surface. In principle, the higher the pentad fraction, the higher the degree of crystallinity.

(Inorganic Pigment)

The inorganic pigment may be a known inorganic pigment for imparting a concealing effect, typically titanium oxide. Examples of inorganic pigments for coloring include complex oxides such as iron-zinc, chromium-antimony, and iron-aluminum, and iron oxides, and the mixture ratio of these pigments can be freely adjusted according to the desired color. As further examples, an inorganic pigment such as aluminum flakes or a pearl pigment, that imparts a lustrous effect, may be added. Also, for example, an organic pigment such as carbon black may be additionally used.

An additive such as a fatty acid metal salt may be added to improve dispersibility and extrusion suitability.

(Nucleating Agent Vesicle)

The skin layers 1b of the substrate layer 1 may contain a nanoscale nucleating agent. The nanoscale nucleating agent may be added to the polypropylene resin in the form of nucleating agent vesicles that contain the nucleating agent inside a vesicle having a single-layer outer membrane. When the skin layers 1b of the substrate layer 1 contain the nucleating agent, the crystallinity of the polypropylene resin can be improved, which in turn improves the abrasion resistance (scratch resistance) of the substrate layer 1. In the present embodiment, the nucleating agent in the resin forming the skin layers 1b of the substrate layer 1 may be contained in vesicles in a state of being partially exposed.

The nanoscale nucleating agent preferably has a mean particle size of ½ or less of the visible light wavelength region. Specifically, since the visible light wavelength region is 400 nm or more and 750 nm or less, the mean particle size is preferably 375 nm or less.

Since the nanoscale nucleating agent has a very small particle size, the number and the surface area of nucleating agent particles per unit volume increase in inverse proportion to the cube of the particle diameter. As a result, since the distances between nucleating agent particles becomes short, when crystal growth occurs from the surface of one nucleating agent particle added to the polypropylene resin, an edge of the growing crystal immediately touches an edge of a crystal growing from the surface of another nucleating agent particle next to that nucleating agent particle. The growth of each crystal stops as a result of the edge of each crystal inhibiting the growth of the other crystal. This makes it possible to reduce the mean particle size of the spherulites in the crystal part of the crystalline polypropylene resin. For example, the spherulite size can be reduced to 1 µm or less. As a result, a colored polypropylene film with a high degree of crystallinity and high hardness can be obtained. Further, since the stress concentration between spherulites generated during bending is efficiently spread, a colored polypropylene film capable of suppressing cracking and blushing during bending can be realized.

When the nucleating agent is simply added, the particle size increases due to the secondary aggregation of nucleating agent particles in the polypropylene resin, and the number of crystal nuclei relative to the amount of nucleating agent added may be significantly smaller than that of when it is added as nucleating agent vesicles. Cracking and blushing during bending may not be able to be suppressed due to the increased mean particle size of the spherulites in the crystal part of the polypropylene resin. Therefore, it may not be possible to achieve both workability and an improved elastic modulus by increasing the degree of crystallinity.

The quantity of nucleating agent vesicles added to form the skin layers 1b of the substrate layer 1 made of a colored polypropylene film, which constitute part of the decorative sheet 10 of the present embodiment, is, in terms of the amount of nucleating agent added, 0.05 parts by mass or more and 0.5 parts by mass or less per 100 parts by mass of the polypropylene resin as the main component, and preferably 0.1 parts by mass or more and 0.3 parts by mass or less. When the quantity of nucleating agent vesicles added is less than 0.05 parts by mass, the degree of crystallinity may not be sufficiently improved, and the required elastic modulus (hardness) may not be achieved. When the quantity of nucleating agent vesicles added exceeds 0.5 parts by mass, the excessive number of crystal nuclei inhibits the spherulite growth, so that the degree of crystallinity may not be sufficiently improved, and the required elastic modulus (hardness) may not be reached.

As a method of nucleating agent nanonization, for example, it is possible to use an appropriate one of a solid-phase method in which the nucleating agent is mainly mechanically pulverized to obtain nanoscale particles, a liquid-phase method in which the syntheses and crystallization of nanoscale particles are performed in the nucleating agent or a solution obtained by dissolving the nucleating agent, and a vapor-phase method in which the syntheses and crystallization of nanoscale particles are performed from the nucleating agent or a gas or vapor containing the nucleating agent. Examples of solid-phase methods include ball milling, bead milling, rod milling, colloid milling, conical milling, disk milling, hammer milling, and jet milling. Examples of liquid-phase methods include crystallization, coprecipitation, the sol-gel method, liquid-phase reduction, and hydrothermal synthesis. Examples of gas phase methods include the electric furnace method, chemical flame method, laser method, and thermal plasma method.

The supercritical reverse phase evaporation method is preferably used for the nanonization of the nucleating agent. The supercritical reverse phase evaporation method is a method of preparing capsules (nanoscale vesicles) containing a target substance using carbon dioxide under a supercritical state, or a temperature or pressure condition that is equal to or exceeds the critical point. Carbon dioxide in a supercritical state refers to carbon dioxide that is in a supercritical state with a temperature that is equal to or higher than the critical temperature (30.98° C.) and a pressure that is equal to or higher than the critical pressure (7.3773±0.0030 MPa). Carbon dioxide under a temperature or pressure condition that is equal to or exceeds the critical point indicates carbon dioxide under conditions where only one of the temperature and pressure exceeds the critical condition.

Specifically, as the specific nanonizaiton process by the supercritical reverse phase evaporation method, first, an aqueous phase is injected into a mixed fluid of carbon dioxide in a supercritical state, phospholipid as an outer membrane-forming substance, and a nucleating agent as a substance to be encapsulated, and an emulsion of carbon dioxide in a supercritical state and the aqueous phase is formed by stirring. Then, once the pressure is reduced, the carbon dioxide expands and evaporates, causing phase transition, and nanocapsules (nanovesicles) are formed in which the phospholipid in the form of a single-layer membrane covers the surface of the nucleating agent particle. By using this supercritical reverse phase evaporation method, unlike the conventional encapsulation method in which the outer membrane covering the surface of the nucleating agent particle is a multi-layered membrane, it is possible to easily produce a single-layer membrane capsule, and capsules with a smaller diameter can be prepared.

The nucleating agent vesicles can be prepared by, for example, the Bangham method, extrusion, hydration, detergent dialysis, reverse phase evaporation, freeze-thaw, supercritical reverse phase evaporation, and the like. Among these methods, supercritical reverse phase evaporation is preferred.

The outer membrane forming a nucleating agent vesicle may be, for example, a single-layer membrane. Further, the outer membrane may be made of, for example, a substance containing a biological lipid such as phospholipid.

In this embodiment, nucleating agent vesicles having an outer membrane of biological lipid such as phospholipid are referred to as nucleating agent liposomes.

Examples of the phospholipid that constitutes the outer membrane include glycerophospholipids such as phosphatidylcholine, phosphatidylethanolamine, phosphatidylserine, phosphatidic acid, phosphatidylglycerol, phosphatidylinositol, cardiopine, yolk lecithin, hydrogenated yolk lecithin, soybean lecithin, and hydrogenated soybean lecithin, and sphingophospholipids such as sphingomyelin, ceramide phosphorylethanolamine, and ceramide phosphorylglycerol.

Other example substances that may constitute the outer membrane of vesicles may be a dispersant such as a nonionic surfactant, or a mixture of the nonionic surfactant and cholesterols or triacylglycerol. One or more of the following examples of nonionic surfactants may be used: polyglycerol ether, dialkylglycerine, polyoxyethylene hydrogenated castor oil, polyoxyethylene alkyl ether, polyoxyethylene sorbitan fatty acid ester, sorbitan fatty acid ester, polyoxyethylene polyoxypropylene copolymer, polybutadiene-polyoxyethylene copolymer, polybutadiene-poly 2-vinylpyridine, polystyrene-polyacrylic acid copolymer, polyethylene oxide-polyethylethylene copolymer, and polyoxyethylene-polycaprolactam copolymer. Examples of the cholesterols include cholesterol, α-cholestanol, β-cholestanol, cholestane, desmosterol (5,24-cholestadien-3β-ol), sodium cholate, and cholecalciferol.

The outer membrane of the liposomes may be formed of a mixture of phospholipid and a dispersant. In the decorative sheet 10 of the present embodiment, the nucleating agent vesicles are preferably radical scavenger liposomes having a phospholipid outer membrane. The phospholipid outer membrane ensures good miscibility between the resin material which is the main component of the substrate layer 1 and the vesicles.

The nucleating agent is not particularly limited as long as it is a substance to be a starting point for crystallization upon crystallization of the resin. Examples of the nucleating agent include phosphoric acid ester metal salts, benzoic acid metal salts, pimelic acid metal salts, rosin metal salts, benzylidene sorbitol, quinacridone, cyanine blue, and talc. In particular, to maximize the effect of nanonization, phosphoric ester metal salt, benzoic acid metal salt, pimelic acid metal salt, and rosin metal salt are preferably used because they are non-melting and good transparency is expected. When the material itself can be made transparent by nanonization, quinacridone, cyanine blue, talc, and the like, which are colored, may be used as well. The non-melting nucleating agent may be used by being appropriately mixed with a melting-type benzylidene sorbitol.

As described above, one of the features (matters defining the invention) of the decorative sheet 10 of the present embodiment is that "the skin layers 1b of the substrate layer 1 include a nucleating agent contained in a vesicle". The nucleating agent in the state of being contained in the vesicle is then added to the resin composition, thereby exhibiting the effect of drastically improving dispersibility of the nucleating agent in the resin material, that is, in the skin layers 1b of the substrate layer 1. However, direct specification of such a feature from the structure or the properties of the object in the state of the completed decorative sheet 10 may be assumed to be difficult depending on the situation and may be considered to be impractical. The reasons are as follows. The nucleating agent added in the state of vesicles is in a dispersed condition with high dispersibility, and the nucleating agent in the state of the produced decorative sheet 10 is also highly dispersed in the skin layers 1b of the substrate layer 1. In the production process of the decorative sheet 10 after producing the substrate layer 1 by adding the nucleating agent in the form of vesicles to the resin composition of the skin layers 1b of the substrate layer 1, the laminate is normally subjected to various types of processing, such as compression and curing. However, due to such processing, the outer membrane of the vesicle containing the nucleating agent may be crushed or chemically react, which may cause a high risk of the nucleating agent not being enclosed (sheathed) in an outer membrane. This is because the state of crushing or chemical reaction in the outer membrane varies depending on the processing of the decorative sheet 10. The situation, such as that the nucleating agent is not enclosed by an outer membrane, is difficult to specify by physical properties using numerical ranges. Further, a component of the crushed outer membrane may be difficult to determine as either the outer membrane of the vesicle or a material added separately from the nucleating agent. Thus, while the present invention is different from the conventional art in that the nucleating agent is blended in the substrate layer 1 in a highly dispersed condition, it may be impractical to determine whether this is attributed to the fact that the nucleating agent has been added in the form of vesicles containing nucleating agent, from a numerical range that can be obtained from an analysis based on the measurements of structure and properties of the decorative sheet 10.

The nucleating agent vesicles having the above structure may also be contained in the transparent resin layer 3.

<Pattern Layer 2>

A pattern layer 2 for adding a pattern to the decorative sheet 10 can be provided on the surface of the colored polypropylene film (substrate layer 1). The design pattern may be, for example, of wood grain, stone, sand, tile, brick, fabric, leather grain, a geometric figure, or the like.

In addition, depending on the intended design, a base solid ink layer (not shown) may be provided between the substrate layer 1 and the pattern layer 2. The base solid ink layer is provided covering the entire surface of the substrate layer 1. If necessary, the base solid ink layer may be a multilayer having two or more layers, to achieve a masking property or the like. Further, the pattern layer 2 may be formed by laminating as many layers as necessary for expression of the desired design. Thus, the pattern layer 2 and the base solid ink layer can be combined in various ways according to the required design, that is, the design to be expressed. However, the combinations are not particularly limited.

The material forming the base solid ink layer and the pattern layer 2 is not particularly limited. For example, the material may be a printing ink or a coating agent in which a matrix and a colorant, such as a dye or a pigment, are dissolved and dispersed in a solvent. Examples of the matrix include various synthetic resins, such as oily nitrocellulose resin, two-component urethane resin, acrylic-based resin, styrene-based resin, polyester-based resin, urethane-based resin, polyvinyl-based resin, alkyd resin, epoxy-based resin, melamine-based resin, fluorine-based resin, silicone-based resin, and rubber-based resin; mixtures thereof; copolymers thereof; and the like. Furthermore, examples of the colorant include inorganic pigments, such as carbon black, titanium white, zinc white, rouge, chrome yellow, Prussian blue and cadmium red; organic pigments, such as azo pigments, lake pigments, anthraquinone pigments, phthalocyanine pigments, isoindolinone pigments and dioxazine pigments; and mixtures thereof. Examples of the solvent include toluene, xylene, ethyl acetate, butyl acetate, methyl alcohol, ethyl alcohol, isopropyl alcohol, acetone, methyl ethyl ketone, methyl isobutyl ketone, cyclohexanone, water, and mixtures thereof.

In order to impart various functions, for example, functional additives, such as an extender pigment, a plasticizer, a dispersant, a surfactant, a tackifier, an adhesion enhancer, a drying agent, a curing agent, a curing accelerator, and a curing retarder, may be added to the base solid ink layer and the pattern layer 2.

The base solid ink layer and the pattern layer 2 may each be formed by various printing methods, such as gravure printing, offset printing, screen printing, electrostatic printing, and ink-jet printing. Since the base solid ink layer covers the entire surface of the substrate layer 1, it can also be formed by various coating methods, such as roll coating, knife coating, micro gravure coating, and die coating. A method may be individually selected from these printing and coating methods for each layer, but it is more efficient to select the same method for all the layers and process them collectively.

<Transparent Resin Layer 3>

The resin material used as the main component of the transparent resin layer 3 is preferably made of olefin-based resin, and may be, besides polypropylene, polyethylene, polybutene, and the like, a homopolymer or a copolymer of one or more of α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc.), and a copolymer of ethylene or an α-olefin with another monomer, for example, an ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, and the like. Further, in order to improve the surface hardness of the decorative sheet 10, as with the skin layers 1b of the substrate layer 1, a highly crystalline polypropylene resin is preferably used.

In the present embodiment, the term "main component" refers to 90% by mass or higher of the total mass of the material in question unless otherwise specified.

When the transparent resin layer 3 is provided, the thickness of the transparent resin layer 3 is preferably in the range of 50 μm or more and 100 μm or less. When the thickness of the transparent resin layer 3 is smaller than 50 μm, the effect of improving the scratch resistance of the surface of the transparent resin layer 3 is small, and the significance of providing the transparent resin layer 3 may be reduced. When the thickness of the transparent resin layer 3 exceeds 100 μm, problems such as blushing and cracking may occur during bending.

However, when the topcoat layer 4 is provided over the transparent resin layer 3, the thickness of the transparent resin layer 3 may be smaller than 50 μm.

Further, the resin composition of the transparent resin layer 3 may contain various functional additives, for example, thermal stabilizer, photostabilizer, anti-blocking agent, catalyst scavenger, coloring agent, light scattering agent, gloss control agent, and the like, as necessary. These various functional additives can be suitably selected from known additives.

<Topcoat Layer 4>

The topcoat layer (surface protective layer) 4 can be provided on the surface of the transparent resin layer 3 if further improvement in scratch resistance and adjustment of gloss are required.

In this embodiment, the front surface of the topcoat layer 4 has a surface shape (asperities) designed so that the front surface of the topcoat layer 4 has a wavy roughness profile measured with a cutoff wavelength s of 8 μm and a cutoff wavelength c of 2.5 mm according to JIS B0601:2001 in a direction perpendicular to a direction in which the topcoat layer 4 faces the transparent resin layer 3, a selected evaluation portion of the wavy roughness profile comprising a plurality of profile elements, an evaluation length of the selected evaluation portion of the wavy roughness profile having 10 mm, the selected evaluation portion of the wavy roughness profile being designed to have an arithmetic mean deviation Ra of 10 μm or less; and have a mean width of the profile elements and a ten point height, the mean width and the ten point height satisfying the following expression (1): 5≤RSm/RzJIS≤40 . . . (1), where RSm represents the mean width, and RzJIS represents the ten point height.

When the surface shape of the topcoat layer 4 satisfies the above conditions, the stain resistance and designability can be improved.

The resin material as the main component of the topcoat layer 4 may be selected as appropriate from the following examples: polyurethane, acrylic silicone, fluorine, epoxy, vinyl, polyester, melamine, aminoalkyd, and urea-based resin materials. The form of the resin materials is not limited, and may be, for example, an aqueous, emulsion, or solvent type. The curing method may be appropriately selected from a one-part type, a two-part type, an ultraviolet curing method, and the like.

The resin material used as the main component of the topcoat layer 4 is preferably a urethane-based resin material obtained using isocyanate in view of workability, cost, cohesive force of the resin itself, and the like. The isocyanate may be appropriately selected from adduct, biuret, and isocyanurate hardeners, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), bis(isocyanatomethyl) cyclohexane (HXDI), trimethylhexamethylene diisocyanate (TMDI), and the like. In view of weatherability, hardeners based on hexamethylene diisocyanate (HMDI) or isophorone diisocyanate (IPDI) having a linear molecular structure are preferred. In addition, in order to improve surface hardness, resins curable with ionizing radiation, such as ultraviolet and electron beams, are preferably used. Moreover, these resins may be used in combination. For example, use of a hybrid of thermally curable resin and a photo-curable resin can improve surface hardness, reduce cure shrinkage, and enhance adhesion.

A gloss control agent can be added to the topcoat layer 4 to control the gloss. A commercially available, known gloss control agent can be used. For example, fine particles of an inorganic material, such as silica, glass, alumina, calcium carbonate, or barium sulfate can be used. Alternatively, fine particles of an organic material such as acrylic resin or the like may be used. However, if high transparency is required, fine particles of silica, glass, acrylic resin, or the like having high transparency are preferably used. In particular, among fine particles of silica, glass or the like, a gloss control agent with a low bulk density, in which fine primary particles undergo secondary aggregation rather than forming solid spherical particles, has a higher matting effect relative to the amount of agent added. As a result, use of such a gloss control agent can reduce the amount of gloss control agent added.

Furthermore, in order to impart various functions, functional additives, such as an antimicrobial agent and an antifungal agent, may be added to the topcoat layer 4. An ultraviolet absorber or a photostabilizer may be added if necessary. For example, the ultraviolet absorber may be a benzotriazole-, benzoate-, benzophenone-, triazine- or cyanoacrylate-based ultraviolet absorber. Examples of photostabilizers that may be used include hindered amine-based light stabilizers.

The thickness of the topcoat layer 4 is preferably 3 μm or more and 15 μm or less. When the thickness of the topcoat layer 4 is smaller than 3 μm, the effect of improving the scratch resistance is small, and the significance of providing the topcoat layer 4 may be reduced. When the thickness of the topcoat layer 4 exceeds 15 μm, it may crack or break while being bent, which may cause problem related to design or reduce the weather resistance.

The tensile modulus of the decorative sheet 10 of the present embodiment, in particular, the tensile modulus of the substrate layer 1 alone may be in the range of 700 MPa or more and 2000 MPa or less. When the tensile modulus is smaller than 700 MPa, it may not be possible to prevent defects from being generated during printing, or to maintain the surface smoothness during wrapping. When the tensile modulus exceeds 2000 MPa, the crystallinity is too high, and problems such as blushing and cracking may occur during bending even when the nucleating agent vesicles are used. A preferable range of tensile moduli is 1000 MPa or more and 1800 MPa or less. When the tensile modulus is within this range, prevention of defects generated during printing, scratch resistance, surface smoothness during wrapping, and flexibility can all be reliably achieved.

[Production Method]

An example of the production of the decorative sheet 10 will be described.

Nucleating agent vesicles are prepared by encapsulating a nucleating agent in vesicles to transform the nucleating agent into vesicles, and the prepared nucleating agent vesicles are added to a polypropylene resin to prepare a resin material for the skin layers. In addition, an inorganic pigment is added to a polypropylene resin to produce a resin material for the core layer.

The nucleating agent vesicles are prepared by, for example, encapsulating the nucleating agent in vesicles having a single-layer membrane by the supercritical reverse phase evaporation method so as to transform it into vesicles.

It is preferred that a highly crystalline homopolypropylene resin having an isotactic pentad fraction (mmmm fraction) of 95% or higher is contained in the polypropylene resin used for the skin layers 1b in a proportion of 30% by mass or more and 100% by mass or less.

The resin materials for the substrate layer are individually heated and melted to be processed by, for example, extrusion, so that a sheet having a thickness of 40 μm or more and 200 μm or less is formed as the substrate layer 1.

The skin layers 1b and the core layer 1a may be formed separately and laminated together using, for example, dry lamination, to produce the substrate layer 1. However, it is easy and productive to prepare the substrate layer 1 by merging the molten resins in the T-die or the feed block before the T-die during extrusion so that the molten resins are co-extruded and shaped.

At this time, the duration of cooling from the crystallization temperature to the temperature at which curing is completed is adjusted using a known adjustment method so that the skin layers 1b of the substrate layer 1 have a controlled Martens hardness of 80 N/mm2 or more and 120 N/mm2 or less. The Martens hardness of the core layer 1a of the substrate layer 1 is controlled to a value within the range of 50 N/mm2 or more and 80 N/mm2 or less.

Further, if necessary, the pattern layer 2 is formed on the upper surface of the substrate layer 1 by printing, and at least one of the transparent resin layer 3 and the topcoat layer 4 is formed thereon by printing.

The thickness of the transparent resin layer 3 is preferably 50 μm or more and 100 or less, the thickness of the topcoat layer 4 is preferably 3 μm or more and 15 μm or less, and the total thickness of the decorative sheet 10 is preferably 100 μm or more and 250 μm or less.

The topcoat layer 4 is formed by performing embossing on the front surface of the topcoat layer 4 so that the front surface of the topcoat layer 4 has a wavy roughness profile measured with a cutoff wavelength s of 8 μm and a cutoff wavelength c of 2.5 mm according to JIS B0601:2001 in a direction perpendicular to a direction in which the topcoat layer 4 faces the substrate layer 1, a selected evaluation portion of the wavy roughness profile comprising a plurality of profile elements, an evaluation length of the selected evaluation portion of the wavy roughness profile having 10 mm, the selected evaluation portion of the wavy roughness profile being designed to have an arithmetic mean deviation Ra of 10 μm or less; and have a mean width of the profile elements and a ten point height, the mean width and the ten point height satisfying the following expression (1): $5 \leq RSm/RzJIS \leq 40$ ... (1), where RSm represents the mean width, and RzJIS represents the ten point height.

<Advantageous Effects and Others>

(1) The decorative sheet 10 of this embodiment has the topcoat layer 4 disposed to face the substrate layer 1 in a first direction. The front surface of the topcoat layer 4 is designed so that the front surface of the topcoat layer 4 has a wavy roughness profile measured with a cutoff wavelength s of 8 μm and a cutoff wavelength c of 2.5 mm according to JIS B0601:2001 in a second direction perpendicular to the first direction, a selected evaluation portion of the wavy roughness profile comprising a plurality of profile elements, an evaluation length of the selected evaluation portion of the wavy roughness profile having 10 mm, the selected evaluation portion of the wavy roughness profile being designed to have an arithmetic mean deviation Ra of 10 μm or less; and have a mean width of the profile elements and a ten point height, the mean width and the ten point height satisfying the following expression (1): $5 \leq RSm/RzJIS \leq 40$ ... (1), where RSm represents the mean width, and RzJIS represents the ten point height.

According to this configuration, even when a staining substance enters the gaps in the uneven surface of the decorative sheet 10, it can be easily wiped off. In addition, since the asperities are maintained in an appropriate shape, the designability is not impaired.

(2) The decorative sheet 10 of the present embodiment includes the substrate layer 1a made of a colored polypropylene film including the core layer 1a containing an inorganic pigment and a polypropylene resin, and the skin layers 1b made of a polypropylene such that the core layer 1a is interposed between the skin layers 1b. The skin layers 1b of the substrate layer 1 contain a nanoscale nucleating agent added as nucleating agent vesicles such that the nucleating agent is encapsulated in vesicles containing the nucleating agent enclosed in their outer membranes. The skin layers 1b have a Martens hardness of 80 N/mm2 or more and 120 N/mm2 or less, the core layer 1a has a Martens hardness of 50 N/mm2 or more and 80 N/mm2 or less, and the thickness of the substrate layer 1 is 40 μm or more and 200 μm or less.

According to this configuration, a nucleating agent that improves the crystallinity of the polypropylene resin is transformed into vesicles and added as nucleating agent vesicles, and further the Martens hardness and film thickness are optimized. This makes it possible to provide a decorative sheet 10 with good scratch resistance.

(3) The decorative sheet 10 of the present embodiment is preferably configured so that the thickness of the core layer 1a is 3 times or more and 50 times or less that of each of the skin layers 1b of the substrate layer 1.

According to this configuration, scratch resistance, impact resistance, strong concealing effect, and flexibility can all be reliably achieved.

(4) The decorative sheet 10 of the present embodiment is preferably configured so that the quantity of nucleating agent vesicles added to the skin layers 1b of the substrate layer 1 is, in terms of the amount of nucleating agent in the nucleating agent vesicles, within the range of 0.05 parts by mass or more and 0.5 parts by mass or less per 100 parts by mass of the polypropylene resin.

According to this configuration, the crystallinity of the polypropylene resin forming the skin layers 1b of the substrate layer 1 is sufficiently improved, and the minimally required elastic modulus (hardness) can be ensured.

(5) In the decorative sheet 10 of the present embodiment, the nucleating agent vesicles are preferably nucleating agent liposomes having a phospholipid outer membrane.

With this configuration, good miscibility between the resin material which is the main component of the substrate layer 1 and the vesicles can be achieved.

(6) In the decorative sheet 10 of this embodiment, the nucleating agent vesicles preferably are prepared by encapsulating the nucleating agent in vesicles having a single-layer membrane using the supercritical reverse phase evaporation method so as to transform it into vesicles.

According to this configuration, the crystallinity of the polypropylene resin forming the skin layers 1b of the substrate layer 1 is reliably improved, and the minimally required elastic modulus (hardness) can be ensured.

(7) In the decorative sheet 10 of the present embodiment, the pattern layer 2 is preferably laid over one of the surfaces of the substrate layer 1.

With this configuration, the designability of the decorative sheet 10 can be improved.

(8) In the decorative sheet 10 of the present embodiment, preferably, at least one of the transparent resin layer 3 and the topcoat layer 4 is laid over one of the surfaces of the substrate layer 1, and the total thickness of the decorative sheet 10 is in the range of 100 µm or more and 250 µm or less.

This configuration makes it possible to prevent problems such as the decorative sheet peeling off after some time due to insufficient adhesion caused by the significant decrease in its conformance to the end faces and the laminated part of the wooden base during wrapping.

EXAMPLES

Specific examples of the decorative sheet 10 of the present embodiment will be described below.

The material of the core layer 1a for a colored polypropylene film, containing 60 parts by mass of random polypropylene resin having a 4% ethylene component and a melt flow rate (MFR) of 12 g/10 min (230° C.) and 40 parts by mass of titanium oxide pigment as an inorganic pigment, and the material of the skin layers 1b, containing 50 parts by mass of highly crystalline homopolypropylene resin with a pentad fraction of 97.8%, a melt flow rate (MFR) of 15 g/10 min (230° C.), and a molecular weight distribution MWD (Mw/Mn) of 2.3 and 50 parts by mass of random polypropylene resin having a 4% ethylene component and a melt flow rate (MFR) of 12 g/10 min (230° C.), were co-extruded and shaped using a melt extruder, and a film was formed with a core layer thickness of 100 µm and a skin layer thickness of 5 µm.

Subsequently, corona treatment is performed on both surfaces of the substrate layer 1, and the pattern layer 2 was formed on one of the surfaces by printing a pattern with a two-component urethane ink (V180; manufactured by Toyo Ink Co., Ltd.).

Further, a two-component urethane topcoat (W184; manufactured by DIC Graphics Corp., with an amount of 10 g/m2) was applied to the surface of the pattern layer 2 to form the topcoat layer 4, and the decorative sheet 10 was obtained.

The case in which nucleating agent is added to the skin layers will be described below.

<Method of Producing Nucleating Agent Vesicles>

First, the method of producing nucleating agent liposomes used in the Examples will be described.

To produce the nucleating agent liposomes using the above-described supercritical reverse phase evaporation method, 100 parts by mass of methanol, 70 parts by mass of a phosphoric ester metal salt-based nucleating agent (ADK STAB NA-21, produced by ADEKA Corp.) as a nucleating agent, and 5 parts by mass of phosphatidyl choline as a substance forming an outer membrane of the vesicle were supplied to a high-pressure stainless steel container kept at 60° C., and the container was tightly closed. Carbon dioxide was then injected so that the pressure reached 20 MPa. A supercritical state was thus obtained. 100 parts by mass of ion exchanged water was subsequently added while vigorously stirring the mixture in the container. Maintaining the temperature and pressure at a supercritical state, mixing by stirring was continued further for 15 minutes. After that, the carbon dioxide was discharged from the container to return it to atmospheric pressure, thereby forming nucleating agent vesicles containing a nucleating agent in the vesicle having a single-layer phospholipid outer membrane.

The material of the core layer 1a for a colored polypropylene film, containing 60 parts by mass of random polypropylene resin having a 4% ethylene component and a melt flow rate (MFR) of 12 g/10 min (230° C.) and 40 parts by mass of titanium oxide pigment as an inorganic pigment, and the material of the skin layers 1b, containing 50 parts by mass of highly crystalline homopolypropylene resin with a pentad fraction of 97.8%, a melt flow rate (MFR) of 15 g/10 min (230° C.), and a molecular weight distribution MWD (Mw/Mn) of 2.3, 50 parts by mass of random polypropylene resin having a 4% ethylene component and a melt flow rate (MFR) of 12 g/10 min (230° C.), and 0.1 parts by mass of the above-described nucleating agent vesicles as a nucleating agent, were co-extruded and shaped using a melt extruder, and a film was formed with a core layer thickness of 100 µm and a skin layer thickness of 5 µm. The subsequent steps are the same.

After forming the topcoat layer 4, a decorative sheet was prepared so that it has an arithmetic mean deviation Ra of 3.7, and the value of mean width RSm of roughness profile elements/ten point height RzJIS of roughness profile is 7.7, and used as the decorative sheet 10 of Example 1.

After forming the topcoat layer 4, a decorative sheet was prepared so that it has an arithmetic mean deviation Ra of 6.1, and the value of mean width RSm of roughness profile elements/ten point height RzJIS of roughness profile is 11.0, and used as the decorative sheet 10 of Example 2.

After forming the topcoat layer 4, a decorative sheet was prepared so that it has an arithmetic mean deviation Ra of 2.4, and the value of mean width RSm of roughness profile elements/ten point height RzJIS of roughness profile is 14.1, and used as the decorative sheet 10 of Example 3.

After forming the topcoat layer 4, a decorative sheet was prepared so that it has an arithmetic mean deviation Ra of 3.8, and the value of mean width RSm of roughness profile elements/ten point height RzJIS of roughness profile is 15.0, and used as the decorative sheet 10 of Example 4.

Example 5

After forming the topcoat layer 4, a decorative sheet was prepared so that it has an arithmetic mean deviation Ra of 5.5, and the value of mean width RSm of roughness profile elements/ten point height RzJIS of roughness profile is 18.6, and used as the decorative sheet 10 of Example 5.

Example 6

After forming the topcoat layer 4, a decorative sheet was prepared so that it has an arithmetic mean deviation Ra of 2.9, and the value of mean width RSm of roughness profile elements/ten point height RzJIS of roughness profile is 21.8, and used as the decorative sheet 10 of Example 6.

Example 7

After forming the topcoat layer 4, a decorative sheet was prepared so that it has an arithmetic mean deviation Ra of 4.9, and the value of mean width RSm of roughness profile elements/ten point height RzJIS of roughness profile is 22.1, and used as the decorative sheet 10 of Example 7.

Example 8

After forming the topcoat layer 4, a decorative sheet was prepared so that it has an arithmetic mean deviation Ra of 3.9, and the value of mean width RSm of roughness profile elements/ten point height RzJIS of roughness profile is 25.8, and used as the decorative sheet 10 of Example 8.

Example 9

After forming the topcoat layer 4, a decorative sheet was prepared so that it has an arithmetic mean deviation Ra of 3.9, and the value of mean width RSm of roughness profile elements/ten point height RzJIS of roughness profile is 28.9, and used as the decorative sheet 10 of Example 9.

Example 10

After forming the topcoat layer 4, a decorative sheet was prepared so that it has an arithmetic mean deviation Ra of 3.9, and the value of mean width RSm of roughness profile elements/ten point height RzJIS of roughness profile is 31.1, and used as the decorative sheet 10 of Example 10.

Example 11

The skin layers 1b were formed using the polypropylene resin to which the above-described nucleating agent was added. After forming the topcoat layer 4, a decorative sheet was prepared so that it has an arithmetic mean deviation Ra of 3.5, and the value of mean width RSm of roughness profile elements/ten point height RzJIS of roughness profile is 7.6, and used as the decorative sheet 10 of Example 11.

Example 12

The skin layers 1b were formed using the polypropylene resin to which the above-described nucleating agent was added. After forming the topcoat layer 4, a decorative sheet was prepared so that it has an arithmetic mean deviation Ra of 3.8, and the value of mean width RSm of roughness profile elements/ten point height RzJIS of roughness profile RzJIS is 33.9, and used as the decorative sheet 10 of Example 12.

Comparative Example 1

The skin layers 1b were formed using the polypropylene resin to which the above-described nucleating agent was added. After forming the topcoat layer 4, a decorative sheet was prepared so that it has an arithmetic mean deviation Ra of 7.8, and the value of mean width RSm of roughness profile elements/ten point height RzJIS of roughness profile RzJIS is 2.0, and used as the decorative sheet 10 of Comparative Example 1.

Comparative Example 2

The skin layers 1b were formed using the polypropylene resin to which the above-described nucleating agent was added. After forming the topcoat layer 4, a decorative sheet was prepared so that it has an arithmetic mean deviation Ra of 1.9, and the value of mean width RSm of roughness profile elements/ten point height RzJIS of roughness profile RzJIS is 47.9, and used as the decorative sheet 10 of Comparative Example 2.

Comparative Example 3

After forming the topcoat layer 4, a decorative sheet was prepared so that it has an arithmetic mean deviation Ra of 7.8, and the value of mean width RSm of roughness profile elements/ten point height RzJIS of roughness profile RzJIS is 2.0, and used as the decorative sheet 10 of Comparative Example 3.

<Surface Roughness>

For the topcoat layer 4 of the decorative sheet 10 of each of the Examples and Comparative Examples, the arithmetic mean deviation Ra of the front surface thereof was measured according to JIS B0601:2001 using a surface roughness meter (manufactured by Mitutoyo Co., SJ-310 model), with a cutoff wavelength of 0.008 mm and an evaluation length of 10 mm. Measurements were performed at randomly chosen five points in a direction perpendicular to a direction in which the topcoat layer 4 faced the substrate layer 1, and the mean value was used as the measured value. Table 1 shows the measurement results.

<Stain Resistance>

A blue ink (marker) was applied to the decorative sheet 10 of each of the Examples and Comparative Examples. After leaving it for 4 hours, the decorative sheet was wiped using a neutral detergent or alcohol. Similarly, a crayon, neutral detergent, chemical agent (ethanol), and food (soy sauce) were applied and wiped after being left for 6 hours.

The state of the stain after being wiped was visually observed and rated according to the following rating criteria. The ratings are shown in Table 1.

When the rating is ++ or higher, it is considered that the stain would not be a problem in actual use.

+++: No stain left
++: Slight stain left
+: Stain remained
−: Significant stain remained <Design/Tactile Sensation>

Twenty subjects visually observed the surface of the decorative sheet 10 of each of the Examples and Comparative Examples, and then touched the surface with their hands. The subjects rated them according to the following rating criteria. The ratings are shown in Table 1.

When the rating is "B" or higher, it is considered that there would be no problem in actual use.

A: At least 10 people thought that the surface feels smooth and the design is good.
B: At least 5 and no more than 10 people thought that the surface does not feel uncomfortable and the design is good.
C: Less than 5 people thought that the tactile sensation and design is good.

<Scratch Resistance>

The scratch resistance was evaluated by conducting a pencil hardness test. In the pencil hardness test, an HB pencil was used, and, with the angle of the pencil fixed with respect to the decorative sheet 10 of each of the Examples and Comparative Examples at 45±1°, the pencil was slid applying a load of 750 kg to the pencil, and the surface condition of the decorative sheet 10 was observed (in compliance with the former JIS standard JIS K 5400). The test was performed five times, and the samples were rated according to the rating criteria below. The ratings are shown in Table 1.

When the rating is "B" or higher, it is considered that there would be no problem in actual use. When the rating is "C" or higher, it is considered that there would be no problem although its use is limited to, for example, at a high location on a vertical surface that does not come into contact with furniture or people. The rating is preferably "B" or higher.
- A: No visible scratch or mark at all
- B: Slightly visible pencil mark
- C: Visible pencil mark
- D: Visible scratch made by pencil and tear in colored polypropylene film <Martens Hardness>

The Martens hardness of the core layer 1a and the skin layers 1b was measured by the method specified in ISO14577.

surface of the substrate layer 1, and are decorative sheets 10 that combine stain resistance and designability.

The decorative sheet of the present invention is not limited to the aforementioned embodiment and examples, and various modifications may be made within a range not departing from the spirit of the present invention.

INDUSTRIAL APPLICABILITY

Decorative sheets according to the present invention can be used to decorate the surface of interior and exterior materials of buildings such as houses, construction materials such as finishing materials as well as doors and windows, furniture and fixtures, housing equipment, home appliances,

TABLE 1

| | Ra (um) | RSm (μm) | RzJIS (μm) | RSm/ RzJIS | Nucleating agent vesicles added or not | Tactile sensation Design | Stain resistance | | | | | Martens hardness | | Pencil hardness |
|---|---|---|---|---|---|---|---|---|---|---|---|---|---|---|
| | | | | | | | Marker | Crayon | Detergent | Chemical agent | Food | Skin Layer | Core Layer | |
| Ex. 1 | 3.7 | 229.4 | 29.9 | 7.7 | No | A | ++ | ++ | +++ | +++ | +++ | 78.1 | 48.6 | B |
| Ex. 2 | 6.1 | 356 | 32.4 | 11.0 | No | A | ++ | ++ | +++ | +++ | +++ | 77.5 | 46.8 | B |
| Ex. 3 | 2.4 | 233.8 | 16.6 | 14.1 | No | A | ++ | ++ | +++ | +++ | +++ | 78.0 | 47.5 | B |
| Ex. 4 | 3.8 | 387.5 | 25.9 | 15.0 | No | A | ++ | ++ | +++ | +++ | +++ | 77.3 | 44.3 | B |
| Ex. 5 | 5.5 | 669.8 | 36 | 18.6 | No | A | ++ | ++ | +++ | +++ | +++ | 77.9 | 48.1 | B |
| Ex. 6 | 2.9 | 482.4 | 22.1 | 21.8 | No | A | ++ | ++ | +++ | +++ | +++ | 76.4 | 46.4 | B |
| Ex. 7 | 4.9 | 594.4 | 26.9 | 22.1 | No | A | ++ | ++ | +++ | +++ | +++ | 77.1 | 49.1 | B |
| Ex. 8 | 3.9 | 582.9 | 22.6 | 25.8 | No | A | ++ | ++ | +++ | +++ | +++ | 76.9 | 45.6 | B |
| Ex. 9 | 3.9 | 718.9 | 24.9 | 28.9 | No | A | ++ | ++ | +++ | +++ | +++ | 78.2 | 45.7 | B |
| Ex. 10 | 3.9 | 678.3 | 21.8 | 31.1 | No | A | ++ | ++ | +++ | +++ | +++ | 77.7 | 44.0 | B |
| Ex. 11 | 3.5 | 228.7 | 30.2 | 7.6 | Yes | A | ++ | ++ | +++ | +++ | +++ | 101.1 | 79.4 | A |
| Ex. 12 | 3.8 | 680.9 | 20.1 | 33.9 | Yes | A | ++ | ++ | +++ | +++ | +++ | 105.6 | 76.5 | A |
| Comp. Ex. 1 | 7.8 | 111.1 | 55 | 2.0 | Yes | B | + | + | + | + | + | 111.1 | 70.6 | A |
| Comp. Ex. 2 | 1.9 | 718.9 | 15 | 47.9 | Yes | C | +++ | +++ | +++ | +++ | +++ | 100.3 | 74.5 | A |
| Comp. Ex. 3 | 7.8 | 111.1 | 55 | 2.0 | No | B | + | + | + | + | + | 57.5 | 48.9 | C |

As can be seen from Table 1, since the decorative sheets 10 of Examples 1 to 12 have optimum surface roughness values, they have no problem in stain resistance or designability, and also their pencil hardness test results were good. In particular, the pencil hardness test results of Examples 11 and 12 were very good because substrate layers containing the nucleating agent were used.

On the other hand, for the decorative sheets 10 of Comparative Examples 1 and 2, the scratch resistance is good since they have a suitable Martens hardness, but their surface roughness falls outside the preferred range. The value of RSm/RzJIS of Comparative Example 1 is 2, and due to the large and densely packed asperities on the surface, a staining substance that had strongly adhered to the surface could not be easily wiped off, and a stain was left.

The value of RSm/RzJIS of Comparative Example 2 was 47.9. It does not have so many asperities on the surface, and they are structured to have a gentle slope. Therefore, although staining substances could be wiped off easily, the designability and tactile sensation were impaired.

Finally, as for Comparative Example 3, since not only the surface roughness but also the Martens hardness were outside the preferred range, not only the stain resistance and designability were impaired but also the scratch resistance decreased.

From the above, it can be clearly seen that the decorative sheets 10 of Examples 1 to 12 do not cause problems as the and the like. In particular, decorative sheets according to the present invention are suitable for application to semi-exterior materials that are affected by wind and rain to some extent, such as exterior materials under the eaves and entrance doors, or children's rooms, kitchens and dining rooms, washrooms, and other spaces that are required to have good wipeability, water repellency, stain resistance, and the like against markers, stains resulting from daily activities, and the like.

REFERENCE SIGNS LIST

10 . . . Decorative sheet; 1 . . . Substrate layer; 2 . . . Pattern layer; 3 . . . Transparent resin layer; 4 . . . Topcoat layer; B . . . Base.

What is claimed is:
1. A decorative sheet, comprising:
a substrate layer having opposite first and second major surfaces; and
a surface protective layer having front and back surfaces, the back surface being arranged to face the first major surface of the substrate layer in a first direction,
the front surface of the surface protective layer having a wavy roughness profile measured with a cutoff wavelength λs of 8 μm and a cutoff wavelength λc of 2.5 mm according to JIS B0601:2001 in a second direction perpendicular to the first direction, a selected evaluation portion of the wavy roughness profile comprising a plurality of profile elements, an evaluation length of the selected evaluation portion of the wavy roughness profile having 10 mm, the selected evaluation portion of the wavy roughness profile being designed to:
(1) have an arithmetic mean deviation Ra of 10 μm or less; and
(2) have a mean width of the profile elements and a ten point height, the mean width and the ten point height satisfying the following expression (1):

$$5 \leq RSm/RzJIS \leq 40 \quad (1)$$

where
RSm represents the mean width, and
RzJIS represents the ten point height, wherein:
the substrate layer comprises two skin layers and a core layer interposed between the skin layers, each of the skin layers comprising a polypropylene resin, the core layer comprising an inorganic pigment and a polypropylene resin;
the polypropylene resin of each of the skin layers contains nucleating agent vesicles, each of the nucleating agent vesicles being a vesicle that has a single-layer outer membrane and contains a nanoscale nucleating agent;
each of the skin layers has a Martens hardness of 80 N/mm2 or more and 120 N/mm2 or less;
the core layer has a Martens hardness of 50 N/mm2 or more and 80 N/mm2 or less; and
the substrate layer has a thickness of 40 μm or more and 200 μm or less.

2. The decorative sheet of claim 1, wherein:
the core layer has a thickness 3 times or more and 50 times or less a thickness of each of the skin layers.

3. The decorative sheet of claim 1, wherein:
the polypropylene resin of each of the skin layers contains the nucleating agent vesicles in a range of 0.05 parts by mass or more and 0.5 parts by mass or less per 100 parts by mass of the polypropylene resin in terms of an amount of the nucleating agent in the nucleating agent vesicles.

4. The decorative sheet of claim 1, wherein:
the nucleating agent vesicles are nucleating agent liposomes each having, as the single-layer outer membrane, an outer membrane comprised of phospholipid.

5. The decorative sheet of claim 1, wherein:
the nucleating agent of each nucleating agent vesicle is encapsulated in the vesicle having the single-layer outer membrane by a supercritical reverse phase evaporation method.

6. The decorative sheet of claim 1, further comprising:
a pattern layer arranged to face one of the first and second major surfaces of the substrate layer.

* * * * *